(12) United States Patent
Nagaraja et al.

(10) Patent No.: US 11,469,940 B2
(45) Date of Patent: *Oct. 11, 2022

(54) FAST BEAM RECOVERY USING BEAM INFORMATION IN THE MEASUREMENT REPORT

(71) Applicant: QUALCOMM Incorporated, San Diego, CA (US)

(72) Inventors: Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 16/228,229

(22) Filed: Dec. 20, 2018

(65) Prior Publication Data
US 2020/0204433 A1 Jun. 25, 2020

Related U.S. Application Data

(63) Continuation of application No. 15/708,758, filed on Sep. 19, 2017, now Pat. No. 10,230,447.
(Continued)

(51) Int. Cl.
*H04L 41/0654* (2022.01)
*H04B 7/06* (2006.01)
(Continued)

(52) U.S. Cl.
CPC ....... *H04L 41/0654* (2013.01); *H04B 7/0617* (2013.01); *H04W 24/10* (2013.01); *H04B 7/0413* (2013.01)

(58) Field of Classification Search
CPC . H04B 7/0617; H04B 7/0413; H04L 41/0654; H04W 24/10
See application file for complete search history.

(56) References Cited

U.S. PATENT DOCUMENTS 9,144,075 B2 9/2015 Rubin et al.
9,560,561 B2 1/2017 Son et al.
(Continued)

FOREIGN PATENT DOCUMENTS

CN 103974412 A 8/2014
WO 2014036150 A1 3/2014
(Continued)

OTHER PUBLICATIONS

International Search Report and Written Opinion—PCT/US2017/052476—ISA/EPO—dated Dec. 11, 2017.
(Continued)

*Primary Examiner* — Chi H Pham
*Assistant Examiner* — Weibin Huang
(74) *Attorney, Agent, or Firm* — QUALCOMM Incorporated

(57) ABSTRACT

Certain aspects of the present disclosure provide various techniques for beam recovery. For example, a method for wireless communication by a network entity may include providing configuration information to a user equipment (UE) indicating a sequence of target beams and timing information to try each target beam in the sequence, and attempting to communicate with the UE using one or more of the target beams according to the timing information, in response to a beam failure.

30 Claims, 10 Drawing Sheets

Related U.S. Application Data

(60) Provisional application No. 62/403,468, filed on Oct. 3, 2016.

(51) Int. Cl.
*H04W 24/10* (2009.01)
*H04B 7/0413* (2017.01)

(56) References Cited

U.S. PATENT DOCUMENTS

| | | | | |
|---|---|---|---|---|
| 10,004,077 | B2* | 6/2018 | Sung | H04W 72/046 |
| 10,230,447 | B2* | 3/2019 | Nagaraja | H04B 7/0617 |
| 2013/0155847 | A1* | 6/2013 | Li | H04W 24/04 370/225 |
| 2014/0204000 | A1 | 7/2014 | Sato et al. | |
| 2014/0369328 | A1 | 12/2014 | Park et al. | |
| 2015/0103934 | A1 | 4/2015 | Nam et al. | |
| 2015/0230263 | A1 | 8/2015 | Roy et al. | |
| 2016/0183234 | A1* | 6/2016 | Sung | H04W 72/046 370/329 |
| 2016/0353510 | A1 | 12/2016 | Zhang et al. | |
| 2016/0359538 | A1 | 12/2016 | Onggosanusi et al. | |
| 2017/0288763 | A1* | 10/2017 | Yoo | H04B 7/063 |
| 2017/0302341 | A1* | 10/2017 | Yu | H04B 7/0695 |
| 2018/0091262 | A1 | 3/2018 | Jung et al. | |
| 2018/0324865 | A1* | 11/2018 | Hui | H04W 74/004 |
| 2019/0053288 | A1* | 2/2019 | Zhou | H04B 7/0626 |
| 2019/0075599 | A1* | 3/2019 | Xia | H04B 17/336 |
| 2020/0145079 | A1* | 5/2020 | Marinier | H04L 5/0051 |
| 2020/0178338 | A1* | 6/2020 | Ahn | H04W 72/046 |
| 2020/0396664 | A1* | 12/2020 | Kakishima | H04W 36/305 |

FOREIGN PATENT DOCUMENTS

| | | |
|---|---|---|
| WO | 2016015282 A1 | 2/2016 |
| WO | 2016024788 A1 | 2/2016 |
| WO | 2016127403 A1 | 8/2016 |

OTHER PUBLICATIONS

Samsung: "Discussion on Beam Measurement and Tracking for 5G New Radio Interface in mmWave Frequency Bands", 3GPP Draft; R2-162226 Discussion on Beam Measurement and Tracking for 5G New Radio Interface in mmWave Frequency Bands, 3rd Generation Partnership Project (3GPP), Mobile Competence Centre; 650, Route, vol. RAN WG2, No. Dubrovnik, Croatia; Apr. 11, 2016-Apr. 15, 2016, Apr. 1, 2016 (Apr. 1, 2016), XP051082013, pp. 1-5, Retrieved from the Internet: URL: http://www.3gpp.org/ftp/tsg_ran/WG2_RL2/TSGR2_93bis/Docs/ [retrieved on Apr. 1, 2016].

* cited by examiner

FAST BEAM RECOVERY USING BEAM INFORMATION IN THE MEASUREMENT REPORT

CLAIM OF PRIORITY UNDER 35 U.S.C. § 119

The present application for patent claims benefit of U.S. Provisional Patent Application Ser. No. 62/403,468, filed Oct. 3, 2016, entitled "Fast Beam Recovery Using Beam Information in the Measurement Report," and is a continuation of U.S. patent application Ser. No. 15/708,758 filed Sep. 19, 2017, entitled "Fast Beam Recovery Using Beam Information in the Measurement Report," now allowed, assigned to the assignee hereof and expressly incorporated by reference herein.

BACKGROUND

Field of the Disclosure

Aspects of the present disclosure relate generally to wireless communications systems, and more particularly, to supporting beamforming.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to techniques for beam recovery using beam information in a measurement report.

Aspects generally include methods, apparatus, systems, computer readable mediums, and processing systems, as substantially described herein with reference to and as illustrated by the accompanying drawings.

Certain aspects provide a method for wireless communication by a network entity. The method generally includes providing configuration information to a user equipment (UE) indicating a sequence of target beams and timing information to try each target beam in the sequence of target beams, and attempting to communicate with the UE using one or more of the target beams according to the timing information, in response to a beam failure Certain aspects provide a method for wireless communication by a user equipment (UE). The method generally includes receiving configuration information from a network entity indicating a sequence of target beams and timing information to try each target beam in the sequence of target beams, and attempting to communicate with the network entity using one or more of the target beams according to the timing information, in response to a beam failure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
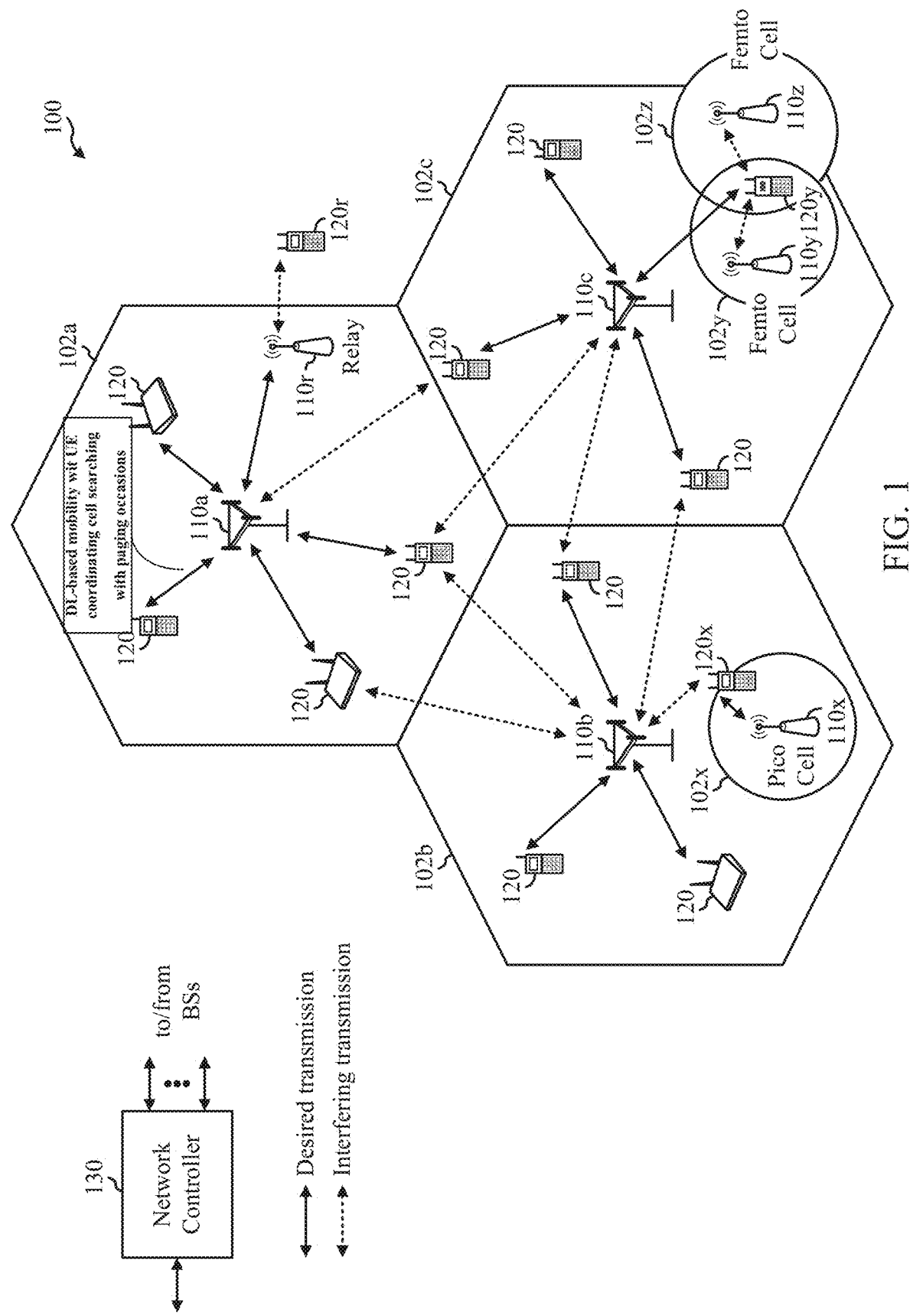
FIG. 1 is a block diagram conceptually illustrating an example telecommunications system, in accordance with certain aspects of the present disclosure.

Aspects of the present disclosure provide apparatus, methods, processing systems, and computer readable mediums for operations that may be performed in new radio (NR) applications (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Beam sweeping, tracking and recovery are considered in the NR enhancements of 3GPP. These may be of particular importance for mmW aspects. Aspects of the present disclosure provide various techniques that may help achieve fast beam recovery. As used herein, beam recovery generally refers to the process of a base station (e.g., eNB) and user equipment (UE) achieving alignment (or synchronization) regarding what beams (or beam pairs) to use after losing such alignment. Such misalignment may occur, for example, if a base station sends a beam switch signal that is not acknowledged by the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network.

According to aspects of the present disclosure, one or more base stations 110 and UEs 120 may communicate using beamforming. Aspects of the present disclosure provide various appropriate frame structures, sweep sequences, and procedures that may assist in beam sweeping, tracking and recovery to improve communication using beamforming.

As will be described in more detail herein, a UE may be in a zone including a serving TRP and one or more non-serving TRPs. The serving and non-serving TRPs may be managed by the same ANC (see e.g., ANC 202 managing three TRPs 208 in FIG. 2). In certain scenarios, the UE may wake up to perform cell searches to enhance decoding of paging messages. For example, performing a cell search prior to decoding a paging message may allow the UE to select a strongest cell (e.g., identified in the cell search).

According to aspects for supporting UL mobility without zone signals, a UE may transmit a first UL chirp signal. The UE may receive a keep alive (KA) signal, in response to the first chirp signal. The KA may be received in a first wake period of a discontinuous receive (DRx) cycle. The UE may transmit a second chirp signal using information determined from the KA signal. Thus, the UE may transmit a second chirp signal without the use of a DL zone synchronization signals. Advantageously, the UE may use information from the KA signal (and in information from a zone signal) to transmit a subsequent chirp signal. For example, the UE may determine a transmit power (for open loop power control) based on the KA. According to another example, the UE may decode a power control field in the KA and transmit the second chirp signal based, at least in part on decoded power control information.

UEs 120 may be configured to perform the operations 1100 and other methods described herein and discussed in more detail below which may help improve DL-based mobility. Base station (BS) 110 may comprise a transmission reception point (TRP), Node B (NB), 5G NB, access point (AP), new radio (NR) BS, etc.). The NR network 100 may include the central unit.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
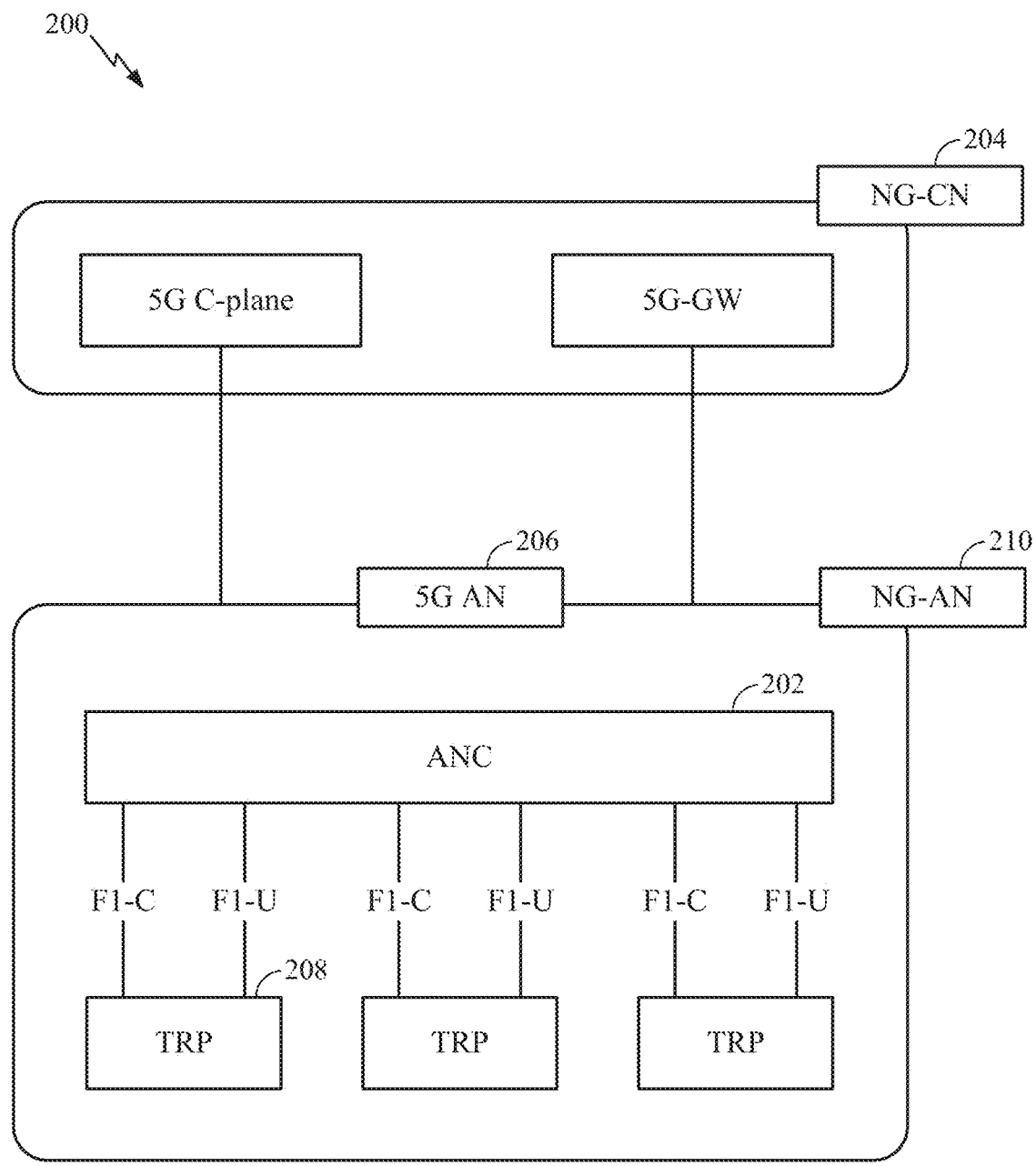
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
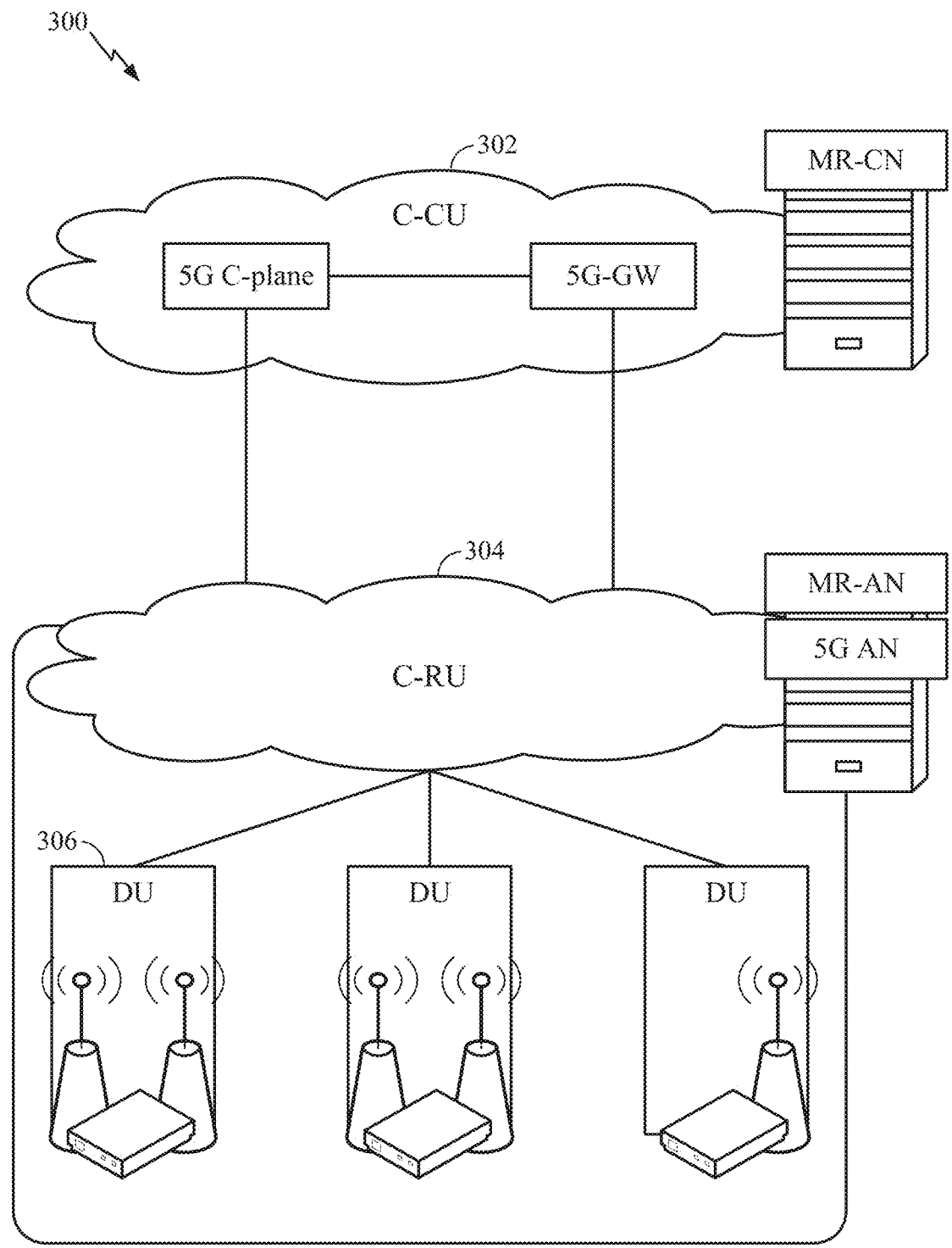
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
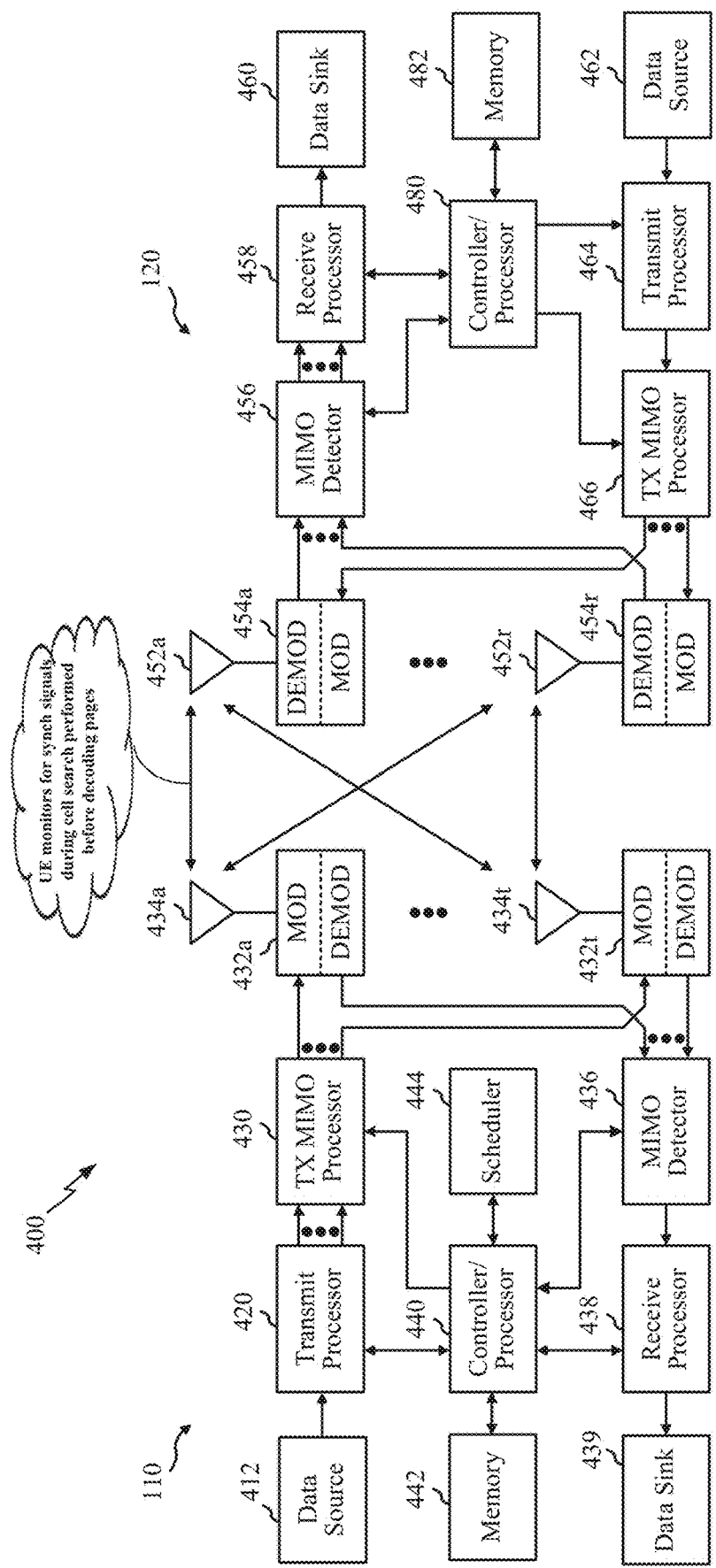
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. For example, UE 120 and BS 110 may be configured to perform beam sweeping, tracking and recovery using the frame structures, sweep sequences, and procedures described herein (e.g., with reference to FIGS. 9a-9d).

As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for a primary synchronization signal (PSS), primary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
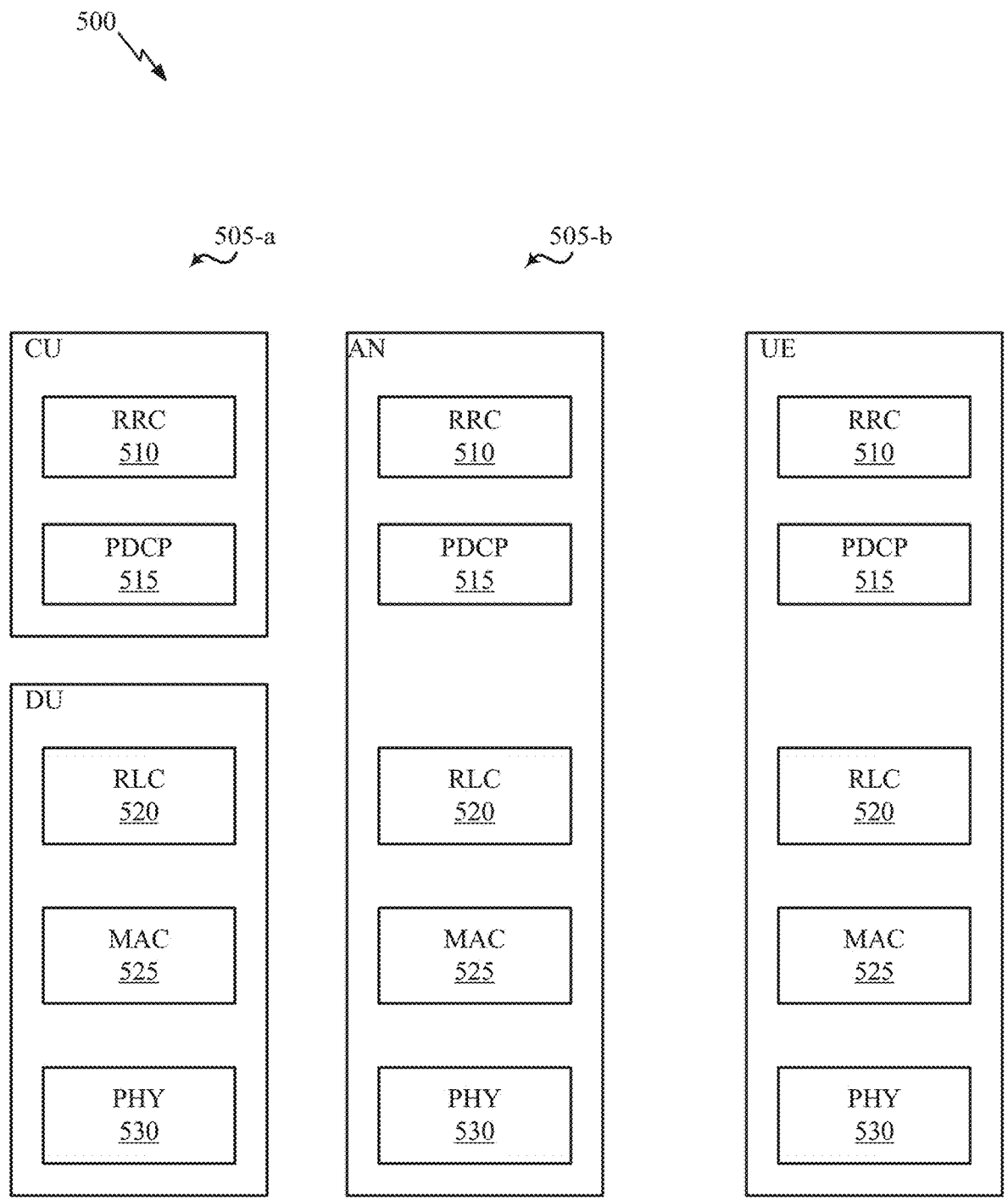
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
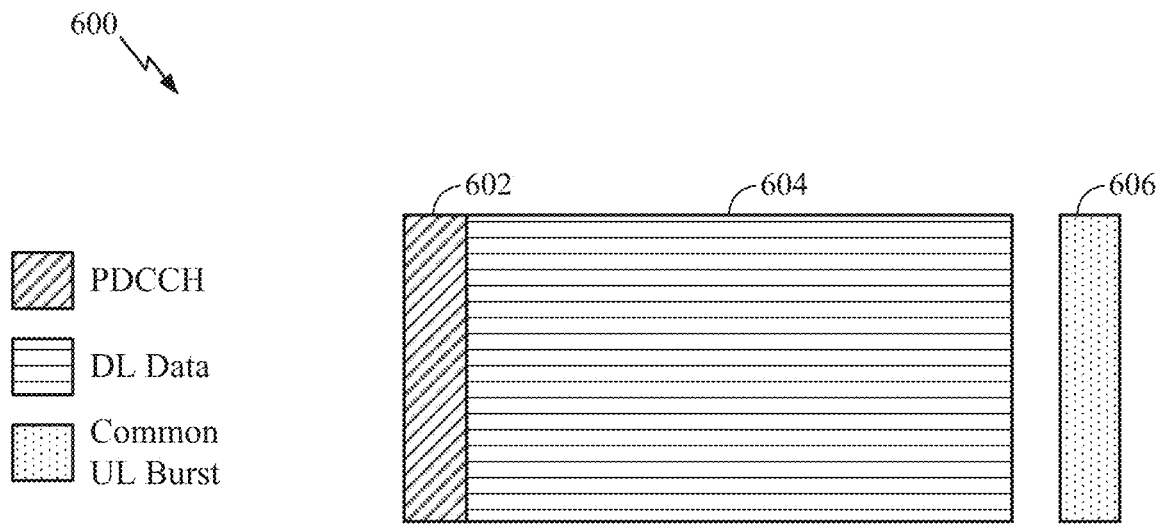
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PD SCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
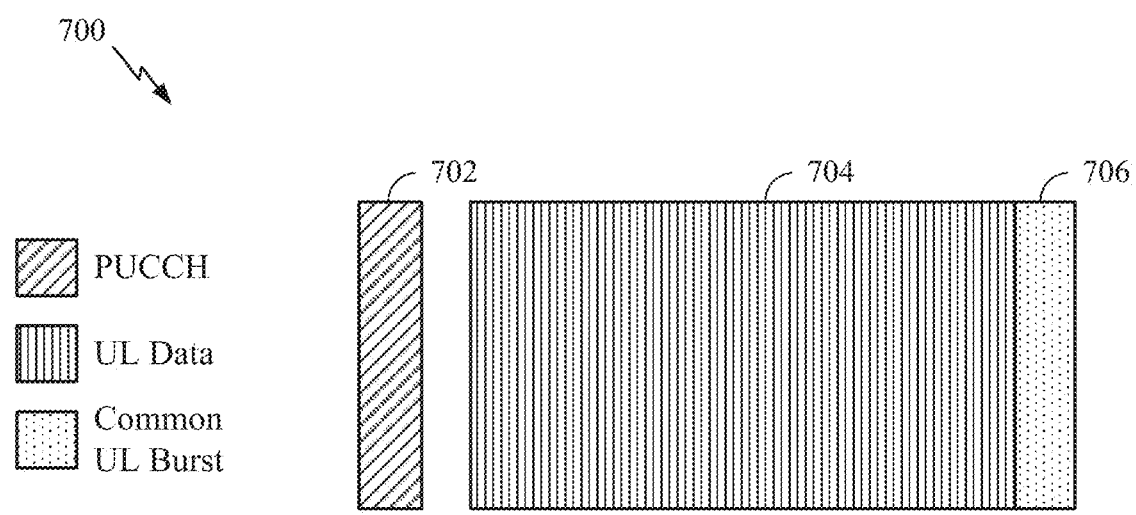
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
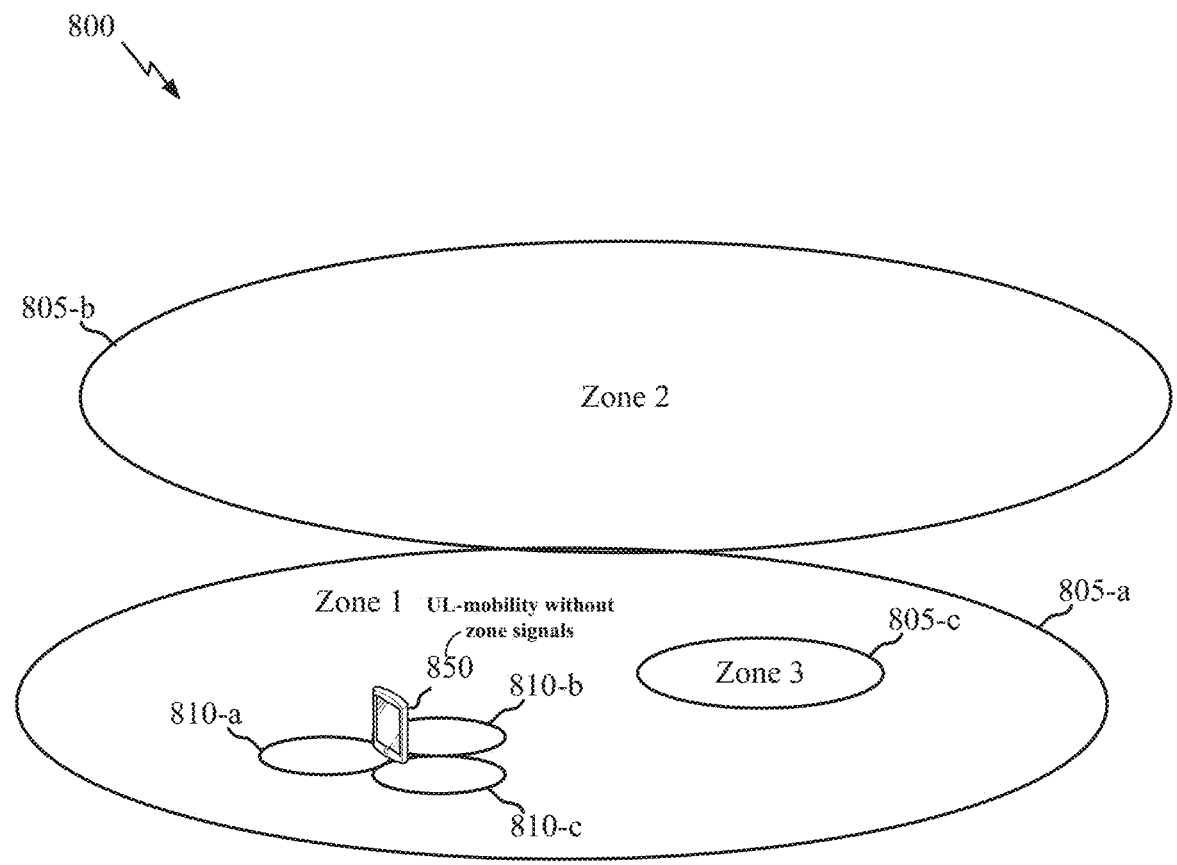
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-*a* (Zone 1), a second zone 805-*b* (Zone 2), and a third zone 805-*c* (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-*a* and the second zone 805-*b*) and overlapping zones (e.g., the first zone 805-*a* and the third zone 805-*c*). In some examples, the first zone 805-*a* and the second zone 805-*b* may each include one or more macro cells, micro cells, or pico cells, and the third zone 805-*c* may include one or more femto cells.

By way of example, the UE 850 is shown to be located in the first zone 805-*a*. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-*a* may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-*a* (e.g., a first cell 810-*a*, a second cell 810-*b*, and a third cell 810-*c*) may monitor the dedicated set of resources for the pilot signal of the UE 850.

According to aspects of the present disclosure, the UE 850 performs one or more operations without relying on a zone signal. For example, the UE may perform an inter-zone handover using synchronization signals associated with a cell/TRP as opposed to a zone synchronization signal.

As described above, beam sweeping, tracking and recovery are considered in the NR enhancements of 3GPP. These may be of particular importance for mmW aspects. Aspects of the present disclosure provide various techniques that may help achieve fast beam recovery.

Beamforming generally refers to the use of multiple antennas to control the direction of a wavefront by appropriately weighting the magnitude and phase of individual antenna signals (for transmit beamforming). Beamforming may result in enhanced coverage, as each antenna in the array may make a contribution to the steered signal, and an array gain (or beamforming gain) is achieved. Receive beamforming makes it possible to determine the direction that the wavefront will arrive (direction of arrival, or DoA). It may also be possible to suppress selected interfering signals by applying a beam pattern null in the direction of the interfering signal.

Adaptive beamforming refers to the technique of continually applying beamforming to a moving receiver. Aspects of the present disclosure may help improve beam recovery in systems that utilize adaptive beamforming.

For beam recovery, a beam acknowledgment report may be sent by the UE if an eNB beam sweep is lost due to packet drop. Alternately, it may be the case that either the eNB/UE side beams are lost either due to sudden blocking of dominant clusters/paths in the channel, UE mobility, etc. In such scenarios, quick recovery mechanisms may be implemented, in an effort to ensure that the link is not lost irrevocably. For example, a beam sweep sequence that sequentially (rapidly) alternates through available beam pairs may help a BS and UE settle on suitable pair quickly.

Example Fast Beam Recovery Using Beam Information in the Measurement Report

One of the challenges presented in mmWave systems is that of high path loss. To address these challenges, new techniques, such as hybrid beamforming (analog and digital), have been proposed. Hybrid beamforming utilizes relatively narrow beam patterns to enhance link budget/SNR between users.

Figure 9:
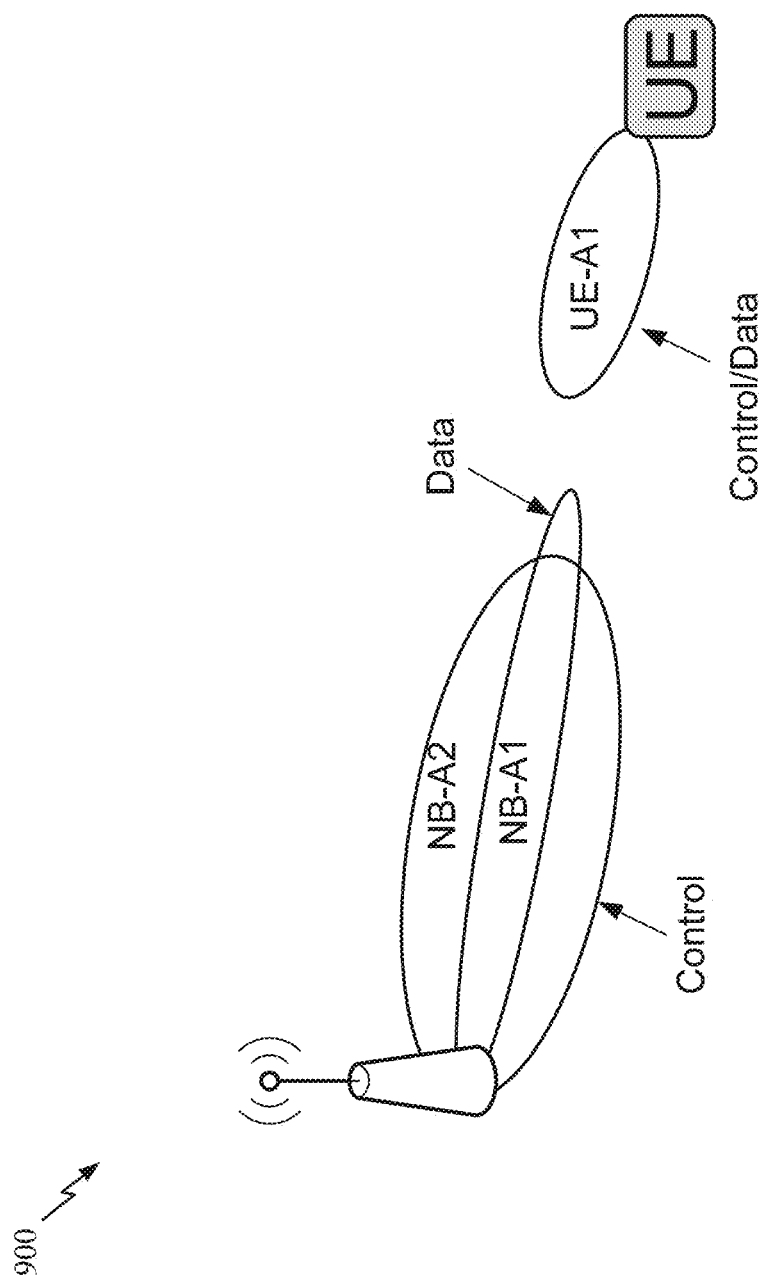
FIG. 9 illustrates example beamformed communications, in accordance with certain aspects of the present disclosure.

FIG. 9 illustrates an example system 900, in which a base station (a NB in this example) and a UE communicate over active beams. Active beams are NB and UE beam pairs that carry data and control channels such as PDSCH, PDCCH, PUSCH, and PUCCH. In the illustrated example, active beam NB-A1 carries data from the NB, active beam NB-A2 carries control, while active beam UE-A1 carries control and data from the UE.

In such a system, the NB may monitor (the performance/suitability of) active beams using reported measurements of signals such as MRS, CSI-RS, or SYNC. To do so, the NB may send a measurement request, for example, a beam state information request to the UE. In response, the UE may measure the measurement signals and send a report that contains feedback, such as a beam id and corresponding beam quality.

After receiving the measurement report, the NB may signal a beam switch to the UE. The beam switch (request/command) may contain the target beam id and/or a time (e.g., in subframes, slots or mini-slots) to switch NB and/or UE beams.

As an alternative, the NB may transmit a beam switch (request/command) that may contain just a command to switch the beam without explicit beam ID. At such a time when the NB signals a beam switch to the UE and the UE receives the signal, both the NB and UE may switch their beams.

After sending a beam switch signal to the UE, the NB may expect an ACK acknowledging the beam switch. If the NB does not receive the ACK, the UE and NB may be considered out of alignment, with respect to beams. For example, assuming an ACK is lost and the NB does not have resources to send another beam switch command to the UE, then NB and UE may be considered misaligned.

A misalignment may cause the UE to trigger either a scheduling request (SR) or random access channel (RACH) procedure in an effort to achieve beam recovery. Both of these approaches, however, incur additional delay and resources.

Aspects of the present disclosure provide techniques that may help achieve relatively fast beam recovery at the NB and UE. The techniques may involve signaling and corresponding action at both the NB and UE sides.

For example, according to one or more cases, on the NB side for fast beam recovery, the NB may send a timer (e.g., T_SR and/or T_RACH), after the expiration of which the UE may start the SR and/or RACH procedure for beam recovery. This timer may be sent over system information (SI) or via an RRC configuration message.

The NB may also configure the UE to take measurements and generate a measurement report which the NB may then obtain from the UE. The measurement report may contain beam reference signal received power (RSRP) of multiple NB-UE beam pairs. For example, the report may include RSRP for a first beam pair (e.g., NBbeam1-UEbeam1), a second beam pair (e.g., NBbeam2-UEbeam2), and the like.

The NB may send a beam switch signal based on the report. For example, in the beam switch signal, the NB may specify target beam id information (e.g., beamid_target) and a time to switch (e.g., time_tgt). The beamid_target, for example, may be one of the beams that were reported in the measurement report.

According to certain aspects of the present disclosure, the NB may also specify explicitly a beam to use for fast-recovery and a time to try fast-recovery. For example, if the beam and time specified in the beam switch signal (beamid_target, time_tgt) fails, the UE may then try one or more recovery beams (e.g., beamid_recover_1, time_recover_1, beamid_recover_2, time_recover_2, . . . ).

The recovery time information (time_recover_1, time_recover_2) may be signaled in different manners. For example, this information may be explicitly indicated in the beam switch message, via RRC signaling, or as system information (SI). Similarly, the beam information may be signaled in different manners. For example, beamid_recover_1, beamid_recover_2, and the like, may be explicitly noted in the beam switch message, via RRC signaling, or implicitly assumed via the order in which these were reported in the measurement report. In some cases, during fast-recovery, the NB may send DL signals and wait for UE to respond on the UL (e.g., by sending SRS, ACK, or some other UL signals).

Upon the expiry of the timer (T_SR and/or T_RACH timers), the NB may wait for the UE to execute beam recovery procedure. The T_SR and T_RACH timers may be configured as timers that count down from a reference time for example, from the symbol where ACK was sent by UE.

On the UE side for fast beam recovery, the UE may receive the timer information (T_SR and/or T_RACH), after the expiration of which, the UE may start the SR and/or RACH procedure for beam recovery. As noted above, this information may be sent over SI or RRC configuration message.

Once the UE receives the beam switch message (e.g., in response to a measurement report sent by the UE), the UE may send an ACK. After a time_target (e.g., as specified in the beam switch message), the UE may switch to the specified beam (e.g., beamid_target). If the UE does not receive any DL signal from the NB, the UE may start a fast recovery process.

According to the fast recovery process, the UE may set it's receive beam towards a specified recovery direction (e.g., beamid_recover_1, for example, using the same beamforming vector used during measurements and reporting) at a specified time (e.g., time_recover_1) and wait for the NB to send a DL message. If no DL signal is received, then the UE may change beams, for example, setting its receive beam towards beamid_recover_2 at time_recover_2 and, again, wait for the NB to send a DL message. The UE may continue to cycle through recovery beams.

Upon the expiry of the T_SR timer, the UE will start the SR procedure. Similarly, upon the expiry of the T_RACH time, the UE may start the RACH procedure. As noted above, T_SR and T_RACH are timers that count down from the symbol where ACK was sent by UE.

However, by providing for a fast beam recovery process, a NB and UE may be able to achieve beam recovery before expiration of the T_SR and/or T_RACH timer. Achieving beam recovery without having to perform SR or RACH procedures may help improve performance.

Figure 10:
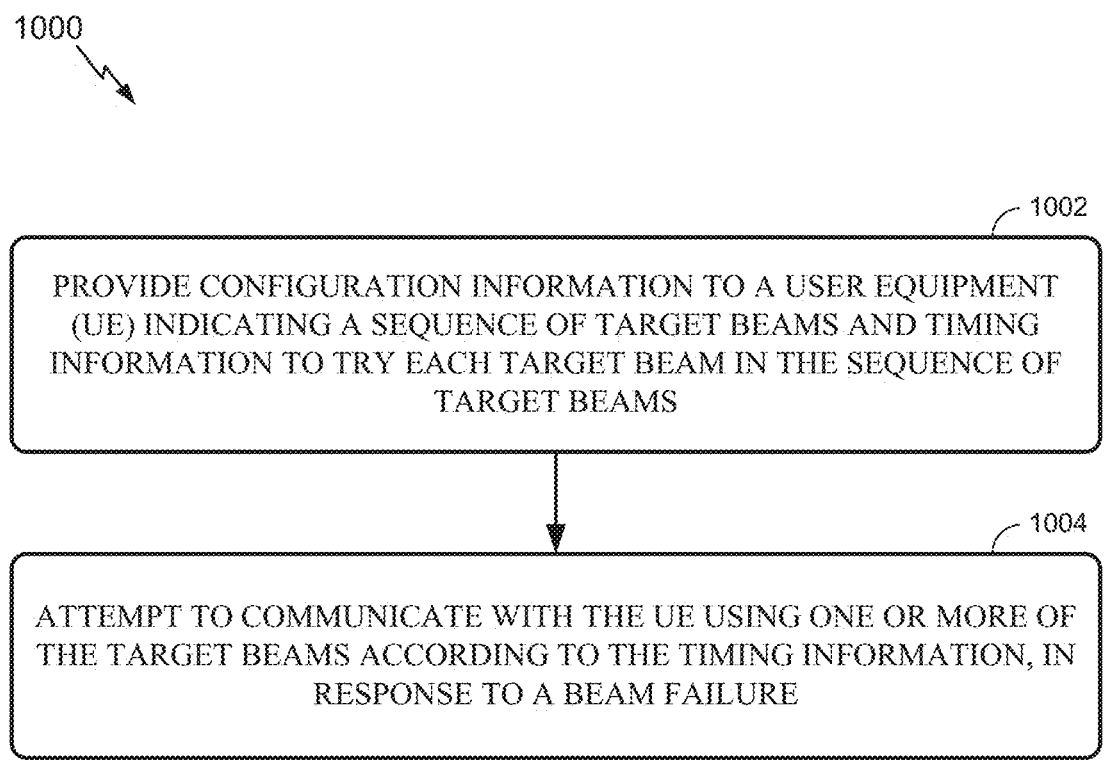
FIG. 10 illustrates example operations for wireless communications by a network entity, in accordance with aspects of the present disclosure.

For example, FIG. 10 illustrates example operations 1000 for wireless communications by a network entity, in accordance with aspects of the present disclosure.

Specifically, operations 1000 begin, at 1002, with providing configuration information to a user equipment (UE) indicating a sequence of target beams and timing information to try each target beam in the sequence of target beams. Further, operations 1000 also include, at 1004, attempting to communicate with the UE using one or more of the target beams according to the timing information, in response to a beam failure.

In accordance with one or more cases, a signal quality of one or more RS configured by the network, in either DL or UL, may fall below a threshold over a period of time. This event may be defined as a beam failure event. Further, a beam failure event may be defined more generally as a failure to receive a response for a DL or UL, data or control transmission.

Figure 11:
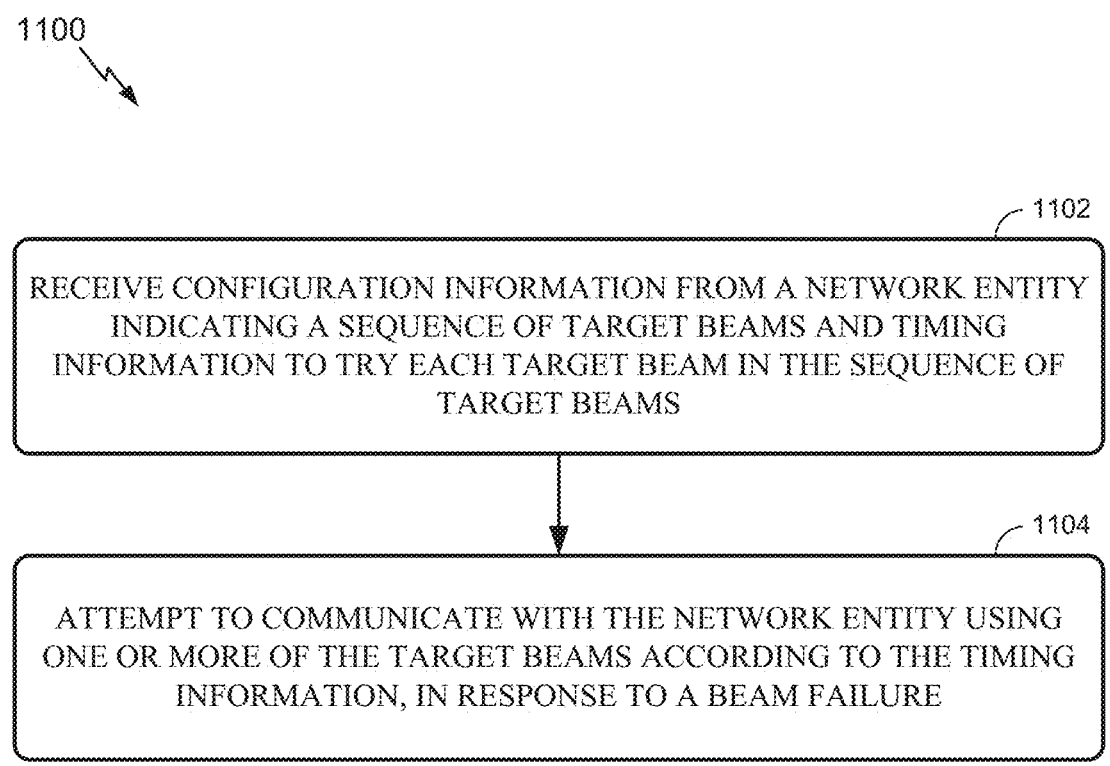
FIG. 11 illustrates example operations for wireless communications by a user equipment (UE), in accordance with aspects of the present disclosure.

FIG. 11 illustrates example operations 1100 for wireless communications by a user equipment (UE), in accordance with aspects of the present disclosure.

Specifically, operations 1100 begin, at 1102, with receiving configuration information from a network entity indicating a sequence of target beams and timing information to try each target beam in the sequence of target beams. The operations 1100 also include, at 1104, attempting to communicate with the network entity using one or more of the target beams according to the timing information, in response to a beam failure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity comprising:
   providing configuration information for beam failure recovery to a user equipment (UE) indicating a sequence of target beams and timing information to try each target beam in the sequence of target beams;
   receiving, from the UE, a beam failure recovery request via one or more of the target beams according to the timing information; and
   transmitting, to the UE, a signal using the one or more of the target beams according to the timing information, in response to the beam failure recovery request from the UE.

2. The method of claim 1, wherein the network entity provides the configuration information in a beam switch signal.

3. The method of claim 1, further comprising:
   communicating using at least one target beam from the sequence of target beams indicated in the configuration information.

4. The method of claim 1, further comprising:
   configuring the UE to generate a measurement report.

5. The method of claim 1, further comprising:
   communicating using at least one target beam from the sequence of target beams based on a measurement report received from the UE.

6. The method of claim 5, wherein the measurement report comprises at least a beam reference signal that indicates a received power of one or more beam pairs.

7. The method of claim 1, wherein the timing information includes at least one timer after expiration of which the UE will start a scheduling request (SR) or a random access channel (RACH) procedure for beam recovery.

8. The method of claim 1, wherein the timing information indicates specific times to try each target beam.

9. The method of claim 1, wherein the network entity is a NodeB.

10. A method for wireless communication by a user equipment (UE) comprising:
    receiving configuration information for beam failure recovery from a network entity indicating a sequence of target beams and timing information, to try each target beam in the sequence of target beams;
    transmitting, to the network entity, a beam failure recovery request via one or more of the target beams according to the timing information in response to a beam failure; and
    receiving, from the network entity, a signal using the one or more of the target beams according to the timing information, in response to the beam failure recovery request from the UE.

11. The method of claim 10, further comprising:
    transmitting an acknowledgement to the network entity that the configuration information was received.

12. The method of claim 10, wherein attempting to communicate comprises:
    generating a measurement report based on received transmissions; and
    transmitting the measurement report to the network entity.

13. The method of claim 12, wherein the measurement report comprises at least a beam reference signal that indicates a received power of one or more beam pairs.

14. The method of claim 10, wherein the timing information includes at least one timer after expiration of which the UE will start a scheduling request (SR) or a random access channel (RACH) procedure for beam recovery.

15. The method of claim 10, wherein the timing information indicates specific times to try each target beam.

16. An apparatus for wireless communications by a network entity comprising:
a processor configured to:
provide configuration information for beam failure recovery to a user equipment (UE) indicating a sequence of target beams and timing information, to try each target beam in the sequence of target beams, the timing information including at least one timer,
receive, from the UE, a beam failure recovery request via one or more of the target beams according to the timing information, and
transmit, to the UE, a signal using the one or more of the target beams according to the timing information, in response to the beam failure recovery request from the UE; and
a memory coupled to the processor.

17. The apparatus of claim 16, wherein the network entity provides the configuration information in a beam switch signal.

18. The apparatus of claim 16, wherein the processor is further configured to communicate using at least one target beam from the sequence of target beams indicated in the configuration information.

19. The apparatus of claim 16, wherein the processor is further configured to configure the UE to generate a measurement report.

20. The apparatus of claim 16, wherein the processor is further configured to communicate using at least one target beam from the sequence of target beams based on a measurement report received from the UE.

21. The apparatus of claim 20, wherein the measurement report comprises at least a beam reference signal that indicates a received power of one or more beam pairs.

22. The apparatus of claim 16, wherein the timing information includes at least one timer after expiration of which the UE will start a scheduling request (SR) or a random access channel (RACH) procedure for beam recovery.

23. The apparatus of claim 16, wherein the timing information indicates specific times to try each target beam.

24. The apparatus of claim 16, wherein the network entity is a NodeB.

25. An apparatus for wireless communication by a user equipment (UE) comprising:
a processor configured to:
receive configuration information for beam failure recovery from a network entity indicating a sequence of target beams and timing information, to try each target beam in the sequence of target beams, the timing information including at least one timer, and
transmit, to the network entity, a beam failure recovery request via one or more of the target beams according to the timing information in response to a beam failure, and
receive, from the network entity, a signal using the one or more of the target beams according to the timing information, in response to the beam failure recovery request from the UE; and
a memory coupled to the processor.

26. The apparatus of claim 25, wherein the processor is further configured to transmit an acknowledgement to the network entity that the configuration information was received.

27. The apparatus of claim 25, wherein the processor is further configured to attempt to communicate by:
generating a measurement report based on received transmissions; and
transmitting the measurement report to the network entity.

28. The apparatus of claim 27, wherein the measurement report comprises at least a beam reference signal that indicates a received power of one or more beam pairs.

29. The apparatus of claim 25, wherein the timing information includes at least one timer after expiration of which the UE will start a scheduling request (SR) or a random access channel (RACH) procedure for beam recovery.

30. The apparatus of claim 25, wherein the timing information indicates specific times to try each target beam.

* * * * *